United States Patent
Recio et al.

(10) Patent No.: US 7,242,183 B2
(45) Date of Patent: Jul. 10, 2007

(54) LOW COST LINEAR POSITION SENSOR EMPLOYING ONE PERMANENT MAGNAT AND ONE GALVANOMAGNETIC SENSING ELEMENT

(75) Inventors: Mario A. Recio, Chihuahua (MX); Arquimedes Godoy, Chihuahua (MX); Susan A. Maxwell, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/068,411

(22) Filed: Feb. 28, 2005

(65) Prior Publication Data

US 2006/0192553 A1 Aug. 31, 2006

(51) Int. Cl.
G01B 7/14 (2006.01)
(52) U.S. Cl. .............................. 324/207.24; 324/207.2
(58) Field of Classification Search .................. None
See application file for complete search history.

(56) References Cited

U.S. PATENT DOCUMENTS

| | | | |
|---|---|---|---|
| 3,473,109 A | 10/1969 | Maaz et al. | |
| 4,319,236 A | 3/1982 | Brace et al. | |
| 4,810,965 A | 3/1989 | Fujiwara et al. | |
| 4,853,629 A | 8/1989 | Rops | |
| 5,315,244 A * | 5/1994 | Griebeler | 324/207.21 |
| 5,332,965 A | 7/1994 | Wolf et al. | |
| 5,497,081 A | 3/1996 | Wolf et al. | |
| 5,565,770 A | 10/1996 | Jones | |
| 6,160,395 A | 12/2000 | Goetz et al. | |
| 6,469,497 B2 | 10/2002 | Schroeder | |
| 6,498,482 B2 | 12/2002 | Schroeder | |
| 6,577,123 B2 | 6/2003 | Schroeder et al. | |
| 6,586,927 B2 | 7/2003 | Pfeil et al. | |
| 2003/0034774 A1 | 2/2003 | Pfeil et al. | |
| 2004/0017187 A1 | 1/2004 | Van Ostrand et al. | |
| 2004/0017190 A1 | 1/2004 | McDearmon et al. | |
| 2004/0164727 A1 | 8/2004 | Lin | |

FOREIGN PATENT DOCUMENTS

| | | |
|---|---|---|
| DE | 197 38 316 | 3/1999 |
| EP | 0 575 971 | 12/1993 |
| EP | 0 733 881 | 9/1996 |
| EP | 0 907 068 | 5/2004 |
| WO | 97/06404 | 2/1997 |
| WO | 02/27266 | 4/2002 |
| WO | 2004/008075 | 1/2004 |

* cited by examiner

Primary Examiner—Jay M. Patidar
(74) Attorney, Agent, or Firm—Paul L. Marshall

(57) ABSTRACT

A sensor assembly is disclosed for measuring the position of a target object as it traverses a linear path of travel within a defined range of measurement. The sensor assembly comprises a ferromagnetic magnetic flux concentrator assembly. The flux concentrator assembly is configured as a generally u-shaped structure including a permanent magnet with elongated ferromagnetic flux concentrator elements affixed at the poles thereof and extending in substantially parallel fashion there from. A galvanomagnetic sensing element is disposed within an air gap between the free end portions of the flux concentrator elements and is displaceable along the longitudinal axis of the flux concentrator assembly. The galvanomagnetic sensing element is configured to provide an output signal indicative of the measured linear position as it travels along the longitudinal axis of the flux concentrator assembly.

10 Claims, 4 Drawing Sheets

LOW COST LINEAR POSITION SENSOR EMPLOYING ONE PERMANENT MAGNAT AND ONE GALVANOMAGNETIC SENSING ELEMENT

The present invention relates generally to position sensors, and, more particularly, to a linear position sensor which employs a single magnet and a single galvanomagnetic sensing element in a relatively compact design with a relatively large sensing range.

BACKGROUND OF THE INVENTION

Angular and linear position sensors are widely used in automatic control systems as feedback-sensing devices in one or more control loops of the system. In the automotive industry a relatively recent trend is providing control-by-wire in lieu of the more traditional control provided by mechanical linkages, such as cables, rods and the like.

Lower cost, higher performance, and utilization of robust sensing technology are some of the factors that make control-by-wire systems attractive to suppliers of automotive equipment, such as the assignee of the present invention. However, these control-by-wire systems generally require more sensors then were required in traditional systems to provide the appropriate control functionality. Examples of sensors that are needed include sensors for providing linear position measurements. Although there are several technologies available for linear position measurement, these technologies may somewhat fall short in meeting the ever-increasing demands that is necessary to successfully compete in the automotive industry. Examples of such demands include lower costs, lower weight and volume as well as higher reliability and performance.

There are some known sensor design arrangements that use a permanent magnet as the moving part relative to a stationary linear Hall device. Unfortunately, such known arrangements require that at least one of the magnet dimensions (e.g., magnet length) be larger than the measurement range of the sensor. This type of arrangement results in increased sensor cost because of the relatively high cost of the magnet, particularly for applications that require a relatively large measurement range.

Another known sensor design arrangement includes two anti-parallel permanent magnets disposed in a spaced apart relationship with a Hall device positioned there between for linear movement parallel to the line of elongation of the permanent magnets. This type of sensor design tends to be extremely expensive. Furthermore, precise alignment of the permanent magnets is difficult.

One design solution is proposed in U.S. patent application Ser. No. 10/374,133 filed on 25 Feb. 2003, now U.S. Pat. No. 6,998,838 B132, issued 14 Feb. 2006, by Y. Lin and assigned to the assignee of the present application. U.S. Ser. No. 10/374,133 is entitled Single Magnet Linear Position Sensor and describes a linear position sensor assembly which includes a magnetic flux concentrator constructed of ferromagnetic materials configured in a generally rectangular structure including an air gap on one side. A permanent magnet is linearly displaceable along the longitudinal axis of the concentrator. A galvanomagnetic sensing element is disposed in the air gap for sensing magnetic flux passing there through. The sensing element is provided to create an output signal indicative of the measured linear position as the magnet travels along the longitudinal axis of the concentrator.

Although having numerous advantages over known prior art designs, particularly in applications having a relatively short measurement range, the one-piece flux concentrator of the Y. Lin device does not lend itself well to some applications, particularly those having characteristic long and intermediate measurement ranges. For each application dictated variant with differing concentrator size and configuration, new tooling and manufacturing equipment would be required, increasing overall costs. Furthermore, the box-shape configuration can be bulky and difficult to package in some applications. This is due to the necessity of positioning the permanent magnet for linear displacement within the concentrator box.

In view of the forgoing, it would be desirable to provide an improved magnetic circuit that is not subject to dimensional constraints of existing sensor arrangements while providing flexibility in accommodating application specific packaging configurations. It would be further desirable to incrementally reduce sensor costs by providing application specific design flexibility, particularly in the configuration and construction of the flux concentrator.

BRIEF DESCRIPTION OF THE INVENTION

Generally, the present invention fulfills the forgoing needs by providing in one aspect thereof, a sensor assembly for measuring linear position. The assembly comprises a magnetic flux concentrator constructed of ferromagnetic materials. The flux concentrator is configured in a generally u-shaped structure including a permanent magnet and discrete flux concentrator elements. The free ends of the concentrator elements form an air gap there between. A galvanomagnetic sensing element is disposed in the air gap for sensing magnetic flux passing there through. The sensing element is configured to provide an output signal indicative of the measured linear position as it travels along the longitudinal axis of the concentrator.

The present invention provides a low cost linear position sensor configuration, which requires only one low cost permanent magnet and low cost flux concentrators. The output of the position sensor is linear to the length of travel. Furthermore, the preferred embodiment of the present invention can be easily modified to accommodate different application mounting and usage requirements.

According to the preferred embodiment of the present invention, a sensor assembly for measuring linear position includes a permanent magnet having a first attachment surface associated with a characteristic north pole and a second attachment surface associated with a characteristic south pole. A first, elongated ferromagnetic flux concentrator is affixed to the permanent magnet at the first attachment surface. A second, elongated ferromagnetic flux concentrator is affixed to the permanent magnet at the second attachment surface. The first and second ferromagnetic flux concentrators extend away from the permanent magnet and are oriented substantially parallel to one another to maintain a substantially fixed spacing there between. Finally, a galvanomagnetic sensing element is disposed within said fixed spacing between the first and second flux concentrators for sensing magnetic flux passing there between. The galvanomagnetic sensing element is displaceable (relative to the permanent magnet and flux concentrators) along a longitudinal axis substantially parallel to the characteristic lines of elongation of the first and second flux concentrators. The galvanomagnetic sensing element is configured to produce an output signal indicative of the measured linear position as the galvanomagnetic sensing element travels along the longitudinal axis.

As an additional feature of the present invention, a third ferromagnetic flux concentrator is disposed adjacent the galvanomagnetic sensing element between the first and second flux concentrators and is configured for displacement with the galvanomagnetic sensing element. This arrangement has the advantage of narrowing the effective air gap and improving the accuracy of measurement of the sensor assembly.

These and other features and advantages of this invention will become apparent upon reading the following specification, which, along with the drawings, describes preferred and alternative embodiments of the invention in detail.

DETAILED DESCRIPTION OF THE PREFERRED AND ALTERNATIVE EMBODIMENTS OF THE INVENTION

Figure 1:
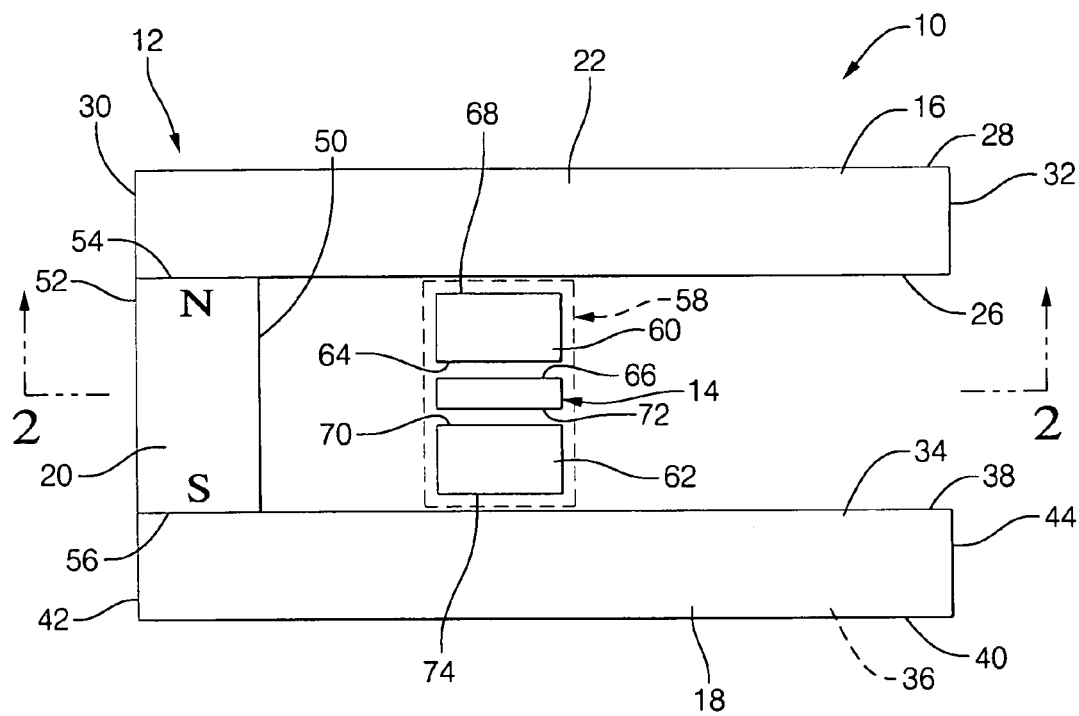
FIG. 1, is a top plan view of a linear position sensor in accordance with the present invention.

FIG. 1 is a top plan view of an exemplary embodiment of a sensor assembly 10 embodying aspects of the present invention for magnetically sensing the linear position of an object. That is, a sensor configured to provide contact less sensing of linear position. Sensor assembly 10 can be employed in a myriad of applications. In the automotive industry, sensor assembly 10 can serve to provide position related feedback to a control system in, by way of example, exhaust gas recirculation (EGR) systems, seat belt deployment systems, throttle body position control systems and the like.

Figure 2:
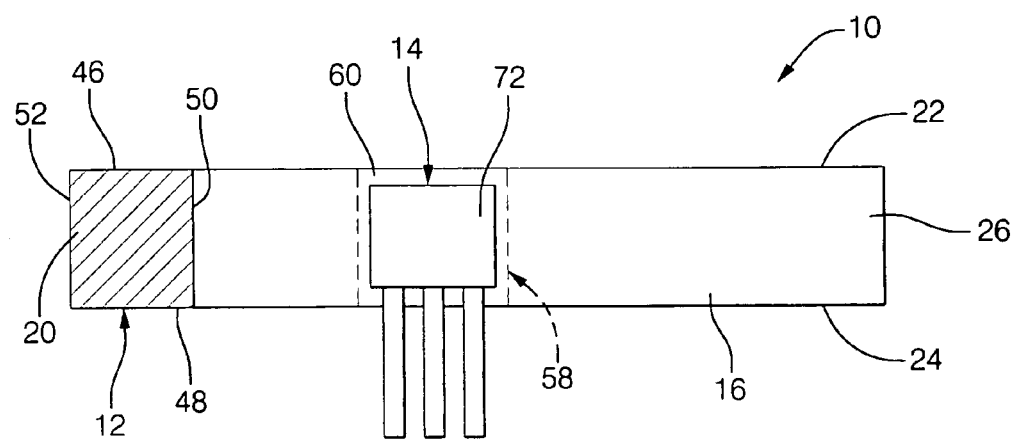
FIG. 2, is a side, cross-section view, taken on lines 2—2 of FIG. 1.

Referring to FIGS. 1 & 2, sensor assembly 10 includes a flux concentrator assembly 12 disposed in functional juxtaposition with a galvanomagnetic sensor 14. Flux concentrator assembly 12 comprises first and second elongated ferromagnetic flux concentrators 16 and 18, respectively, and a permanent magnet 20. Flux concentrators 16 and 18 are made of material having a relatively high permeability, such as ferrite magnetic material, nickel iron, silicone steel, and the like to reduce hysteresis effects.

Flux concentrators 16 and 18 may be configured to have similarly dimensioned generally rectangular characteristic cross-sections and elongated structures. Flux concentrator 16 defines top and bottom surfaces 22 and 24, respectively, inner and outer surfaces 26 and 28, respectively, left end surface 30 and right end surface 32. Likewise, flux concentrator 18 defines top and bottom surfaces 34 and 36, respectively, inner and outer surfaces 38 and 40, respectively, left end surface 42 and right end surface 44.

Permanent magnet 20 may also be configured to have a generally rectangular cross-section and an elongated structure. Permanent magnet defines top and bottom surfaces 46 and 48, respectively, inner and outer surfaces 50 and 52, respectively, a first end surface 54 corresponding with the north pole and a second end surface 56 corresponding with the south pole. Permanent magnet 20 has a characteristic axis of magnetization corresponding with its line of elongation.

As best viewed in FIG. 1, flux concentrators 16 and 18 and permanent magnet 20 are arranged in a generally u-shaped configuration to form the magnetic flux concentrator assembly 12. Flux concentrators 16 and 18 are disposed substantially parallel to one another. The inner surface 26 of flux concentrator 16 is affixed to the first end surface 54 (north pole) of permanent magnet 20 adjacent left end surface 30 of flux concentrator 16. Likewise, the inner surface 38 of flux concentrator 18 is affixed to the second end surface 56 (south pole) of permanent magnet 20 adjacent left end surface 42 of flux concentrator 18.

Flux concentrators 16 and 18 and permanent magnet 20 are permanently affixed together as best illustrated in FIG. 1 such as by bonding with adhesives or other suitable mechanical form of attachment which ensures intimate surface-to-surface contact is maintained.

Definition ally, an imaginary line designated X–X' comprises the longitudinal axis of the linear position sensor assembly 10.

A second flux concentrator assembly 58, including galvanomagnetic sensor 14, a third ferromagnetic flux concentrator 60 and a fourth ferromagnetic flux concentrator 62, is disposed between flux concentrators 16 and 18 and is slid able for rectilinear movement along longitudinal axis X–X' between leftward and rightward limits of travel. Galvanomagnetic sensor 14 is preferably a Hall effect or magnetoresistive sensor.

Referring to FIG. 1, third flux concentrator 60 defines a lower surface 64, which is in intimate contact, or light press fit, with the upper surface 66 of sensor 14. An upper surface 68 of third flux concentrator 60 is in close, or sliding fit, with inner surface 26 of first flux concentrator 16. Likewise, fourth flux concentrator 62 defines an upper surface 70, which is in intimate contact, or light press fit, with the lower surface 72 of sensor 14. A lower surface 74 of fourth flux concentrator 62 is in close, or sliding fit, with inner surface 38 of second flux concentrator 18.

The third and fourth ferromagnetic flux concentrators 60 and 62, respectively, have substantially the same characteristic cross-sectional areas as the first and second flux concentrators 16 and 18, respectively. Furthermore, all four concentrators 16, 18, 60 and 62 are constructed from materials exhibiting substantially similar ferromagnetic properties.

In application, the first magnetic flux concentrator assembly 12 may be mechanically connected to be responsive to linear movement of a work piece (e.g. a lever arm) or any other object whose linear position is being measured by the sensor assembly 10. The second magnetic flux concentrator assembly would be fixedly mounted to a grounded or relatively stationary structure to facilitate electrical interconnection of the galvanomagnetic sensor 14 to a mating control/power circuit. It is possible, of course, to reverse this mounting strategy, wherein the first magnetic flux concentrator assembly 12 would be fixed and the second flux concentrator assembly would be relatively movable.

The present invention permits use of a relatively small permanent magnet 20 relative to the sensing range of the sensor 10. In one exemplary embodiment, it is contemplated that a practical range for the length of the magnet 20 may compromise 20 to 30 percent of the measuring range of the sensor. As will be appreciated by those skilled in the art, this is a significant magnet size reduction over prior art devices that commonly require the magnet length to be larger than the measuring range of the sensor 10. The above exemplary range should not be construed as a limitation of the present invention since both the upper and lower margins of the exemplary range could be adjusted for any given application.

In the configuration described with respect to FIGS. 1 and 2, the third and fourth concentrators 60 and 62, respectively, move in unison with galvanomagnetic sensor 14 against the permanent magnet 20 and first and second concentrators 116 and 118, respectively. This results in extremely good linearity of response.

Figure 3:
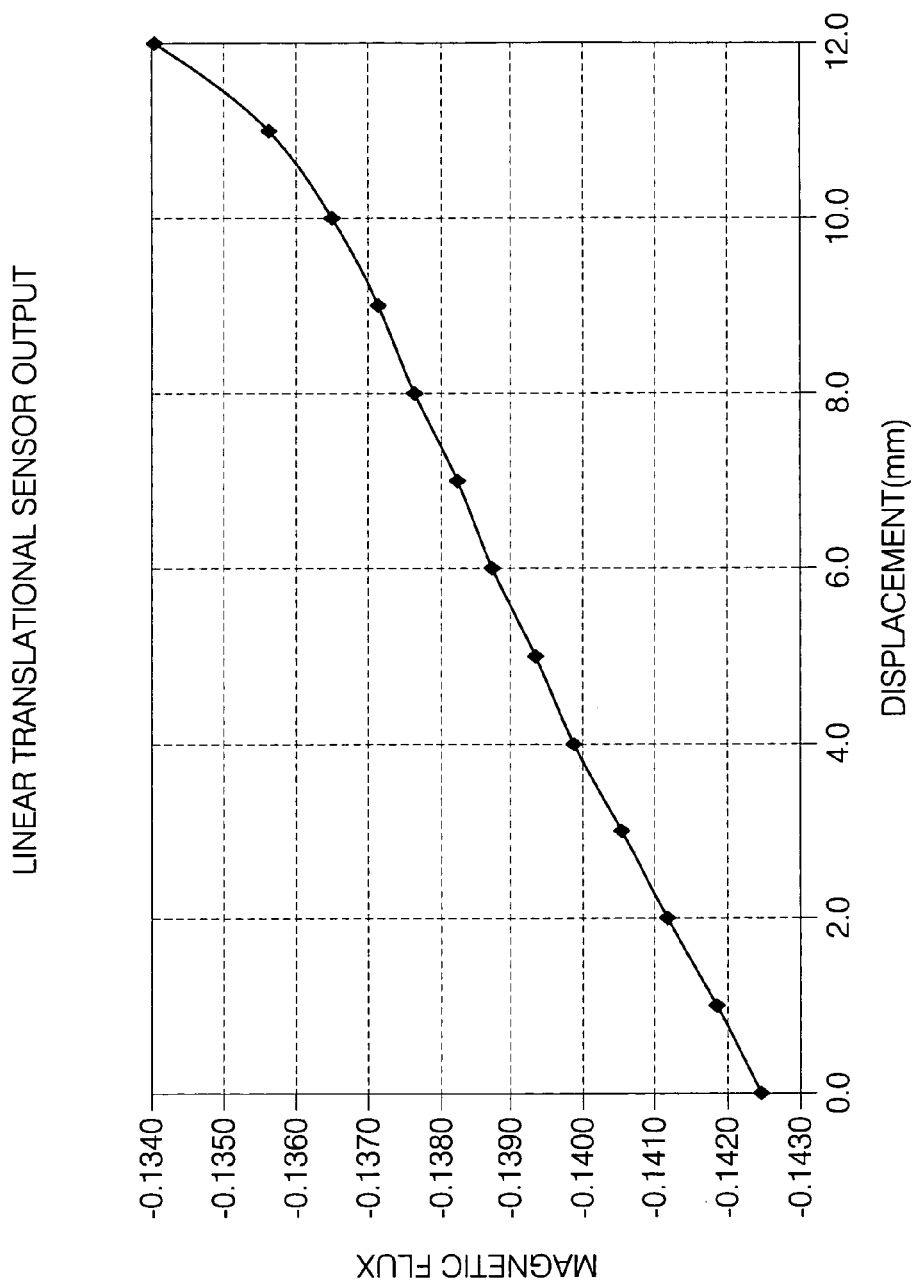
FIG. 3, is a plot of an exemplary magnetic flux response of a magnetic sensor embodying aspects of the present invention depicted in FIGS. 1 & 2 as a function of magnet position.

FIG. 3 is a plot of an exemplary magnetic flux response of one embodiment of a magnetic sensor assembly embodying aspects of linear position sensor assembly 10 depicted in FIGS. 1 & 2 as a function of magnet position along the Y-axis. Thus, it will be appreciated that a sensor 10 embodying aspects of the present invention depicted in FIGS. 1 & 2 is able to provide a substantially linear output over a relatively large range of linear displacement. The plot illustrated in FIG. 3 is non-optimized for the proposed configuration. It is contemplated that the non-linear behavior at the end of travel can be reduced by optimizing the configuration. Besides, the non-linearity is but a small portion of the whole range of travel.

Figure 4:
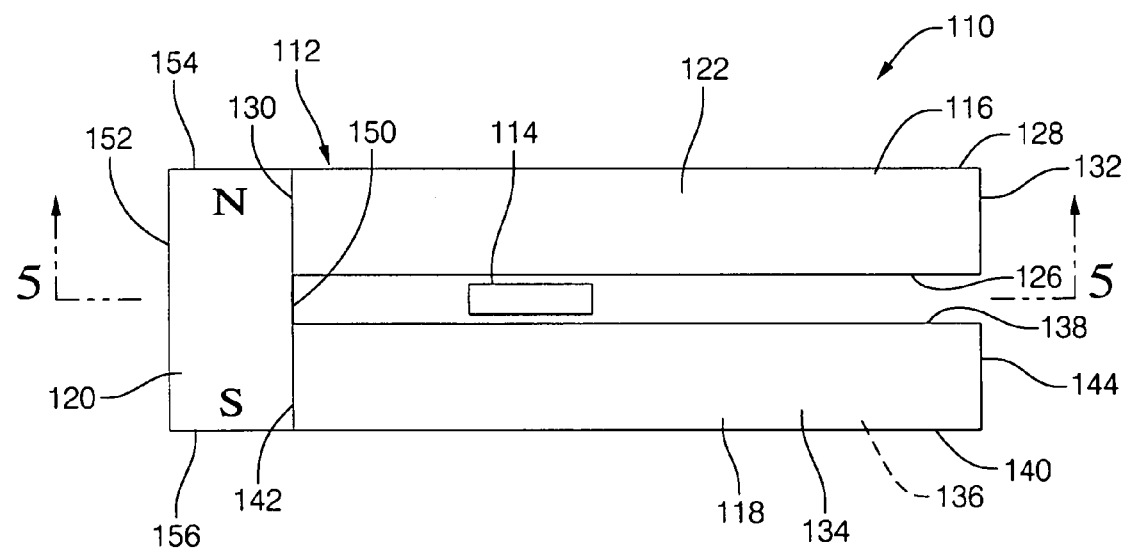
FIG. 4, is a top plan view of an alternative design of a linear position sensor in accordance with the present invention.
Figure 5:
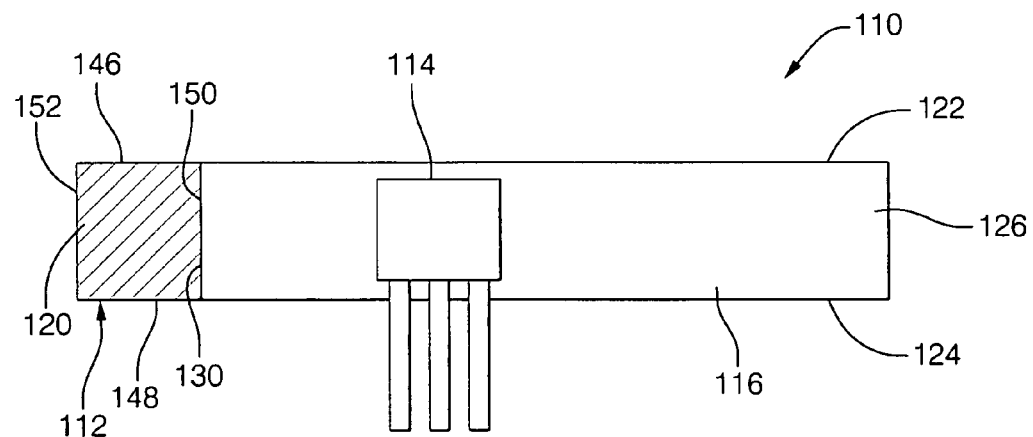
FIG. 5, is a side, cross-section view, taken on lines 5—5 of FIG. 4.
Figure 6:
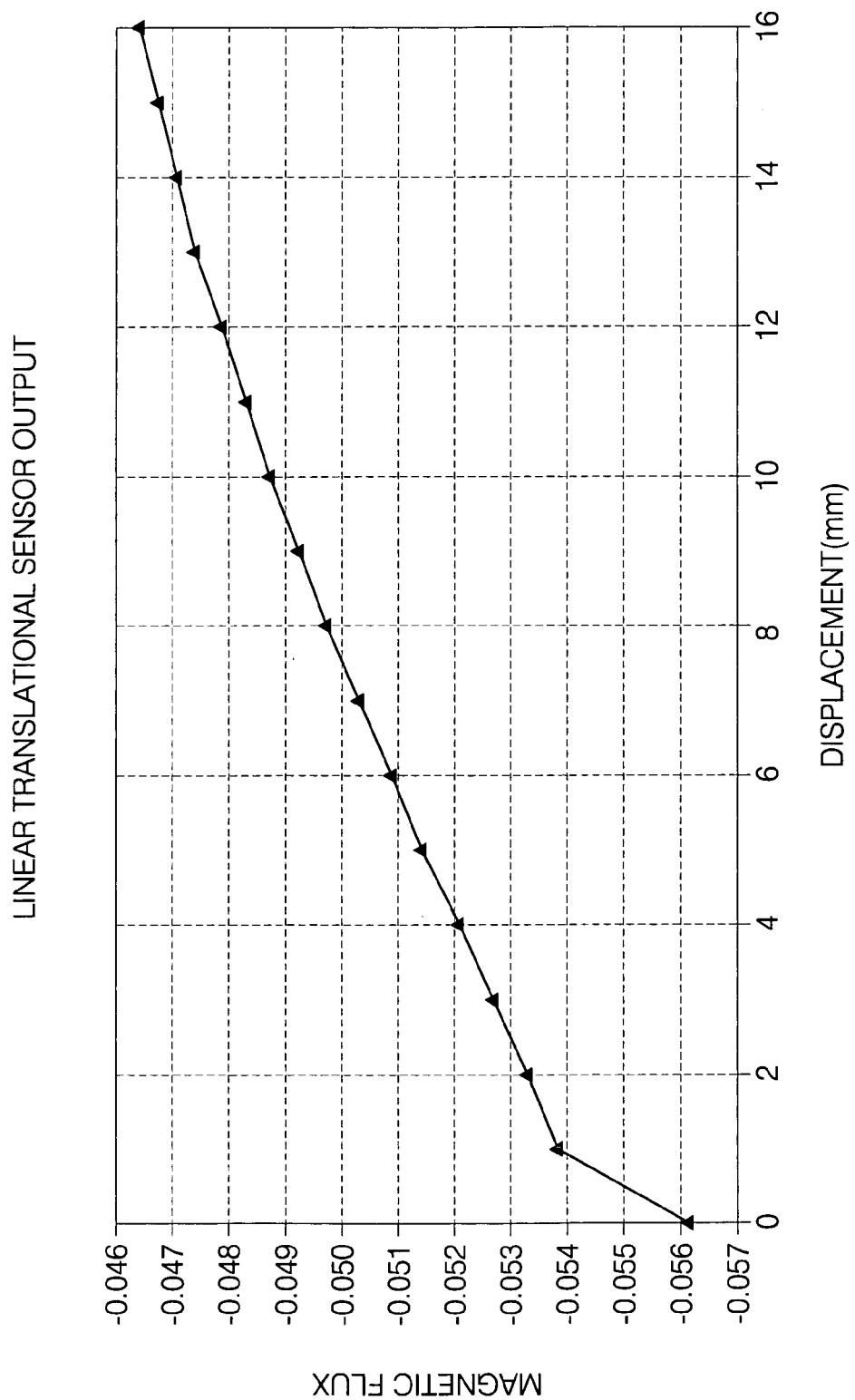
FIG. 6, is a plot of an exemplary magnetic flux response of an alternative magnetic sensor embodying aspects of the present invention depicted in FIGS. 4 & 5 as a function of magnet position.

Referring to FIGS. 4 and 5, an alternative design linear position sensor assembly 110 also embodies aspects of the present invention for magnetically sensing the linear position of an object. Sensor assembly 110 includes a flux concentrator assembly 112 disposed in functional juxtaposition with a galvanomagnetic sensor 114. Flux concentrator assembly 112 comprises first and second elongated ferromagnetic concentrator 116 and 118, respectively, and a permanent magnet 120.

Except as described hereinbelow, sensor assembly 110 is configured and operates substantially as sensor assembly 10 described previously with respect to FIGS. 1 and 2.

Flux concentrators 116 and 118 may be configured to have similarly dimensioned generally rectangular characteristic cross-sections and elongated structures. Flux concentrator 116 defines top and bottom surfaces 122 and 124, respectively, inner and outer surfaces 126 and 128, respectively, left end surface 130 and right end surface 132. Likewise, flux concentrator 118 defines top and bottom surfaces 134 and 136, respectively, inner and outer surfaces 138 and 140, respectively, left end surface 142 and right end surface 144.

Permanent magnet 120 may also be configured to have a generally rectangular cross-section and an elongated structure. Permanent magnet 120 defines top and bottom surfaces 146 and 148, respectively, inner and outer surfaces 150 and 152, respectively, a first end surface 154 corresponding with the north pole and a second end surface 156 corresponding with the south pole. Permanent magnet 120 has a characteristic axis of magnetization corresponding with its line of elongation.

As best viewed in FIG. 4, flux concentrators 116 and 118 and permanent magnet 120 are arranged in a generally u-shaped configuration to form the magnetic flux concentrator assembly 112. Flux concentrators 116 and 118 are disposed substantially parallel to one another. The right end surface 130 of flux concentrator 116 is affixed to the portion of inner surface 150 of the permanent magnet 120 closest to the north pole. Likewise, the right end surface 142 of flux concentrator 118 is affixed to the portion of the inner surface 150 of permanent magnet 120 closest to the south pole.

Flux concentrators 116 and 118 and permanent magnet 120 are permanently affixed together as best illustrated in FIG. 4 such as by bonding with adhesives or other suitable mechanical form of attachment which ensures intimate surface-to-surface contact is maintained.

Definitionally, an imaginary line designated Y-Y' comprises the longitudinal axis of the linear position sensor assembly 110.

Galvanomagnetic sensor 114 is disposed between flux concentrators 116 and 118 and is slid able for rectilinear movement along longitudinal axis Y-Y' between leftward and rightward limits of travel.

In the configuration described with respect to FIGS. 4 and 5, the third and fourth concentrators have been eliminated. This results in a somewhat diminished flux density and linearity. However, this arrangement does have the advantage that it is a less expensive design that is extremely compact and is easily packaged in space-limited applications.

FIG. 5 is a plot of an alternative exemplary magnetic flux response of another embodiment of a magnetic sensor assembly embodying aspects of linear position assembly 110 depicted in FIGS. 4 & 5 as a function of magnet position along the Y-axis. Thus, it will be appreciated that the sensor 110 embodying aspects of the present invention depicted in FIGS. 4 & 5 is able to provide a substantially linear output over a relatively large range of linear displacement.

It is to be understood that the invention has been described with reference to specific embodiments and variations to provide the features and advantages previously described and that the embodiments are susceptible of modification as will be apparent to those skilled in the art.

Furthermore, it is contemplated that many alternative common inexpensive materials can be employed to construct the permanent magnets and flux concentrators. For example, the concentrators can be constructed from any number of metallic and composite materials exhibiting ferromagnetic properties. Accordingly, the forgoing is not to be construed in a limiting sense.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for illustrative purposes and convenience and are not to be in any way limiting, the invention, which is defined by the following claims as interpreted according to the principles of patent law, including the Doctrine of Equivalents, may be practiced otherwise than as specifically described.

What is claimed:

1. A sensor assembly for measuring linear position, said sensor assembly comprising:
    a permanent magnet having a first surface associated with a characteristic north pole and a second surface associated with a characteristic south pole;
    a first, discrete elongated ferromagnetic flux concentrator having an end portion thereof affixed to said first surface of said permanent magnet;

a second, discrete elongated ferromagnetic flux concentrator having an end portion thereof affixed to said second surface of said permanent magnet, said first and second ferromagnetic flux concentrators extending as cantilevers, substantially parallel to one another and maintaining a substantially fixed spacing therebetween, said permanent magnet and flux concentrators forming a generally U-shaped structure with free ends of said flux concentrators forming an air gap therebetween; and a galvanomagnetic sensing element disposed within said fixed spacing between said first and second flux concentrators for sensing magnetic flux passing therebetween and displaceable along a longitudinal axis substantially parallel to the characteristic lines of elongation of said first and second flux concentrators, said galvanomagnetic sensing element configured to produce an output signal indicative of the measured linear position as the galvanomagnetic sensing element travels along said longitudinal axis.

2. The sensor assembly of claim 1, wherein the galvanomagnetic sensing element comprises a Hall effect sensing element.

3. The sensor assembly of claim 1, wherein the galvanomagnetic sensing element comprises a magnetoresistive sensing element.

4. The sensor assembly of claim 1, wherein the galvanomagnetic sensing element comprises a first sensing surface facing said first ferromagnetic flux concentrator and a second sensing surface facing said second ferromagnetic flux concentrator, said sensor assembly further comprising a third ferromagnetic flux concentrator disposed intermediate said first ferromagnetic flux concentrator and said first sensing surface, and configured for displacement with said galvanomagnetic sensing element.

5. The sensor assembly of claim 4, wherein said first and third ferromagnetic flux concentrators have substantially equal cross-sectional areas.

6. The sensor assembly of claim 4, wherein said sensor assembly further comprises a fourth ferromagnetic flux concentrator disposed intermediate said second ferromagnetic flux concentrator and said second sensing surface, and configured for displacement with said galvanomagnetic sensing element.

7. The sensor assembly of claim 6, wherein said second and fourth ferromagnetic flux concentrators have substantially equal cross-sectional areas.

8. The sensor assembly of claim 6, wherein said first, second, third and fourth ferromagnetic flux concentrators have substantially equal cross-sectional areas.

9. The sensor assembly of claim 1, wherein said permanent magnet has a substantially constant cross-sectional area along its line of polarization.

10. A sensor assembly for measuring linear position, said sensor assembly comprising:
 a permanent magnet having a first surface associated with a characteristic north pole and a second surface associated with a characteristic south pole;
 a first, discrete elongated ferromagnetic flux concentrator having an end portion thereof affixed to one of said permanent magnetic surfaces;
 a galvanomagnetic sensing element; and
 a second, discrete ferromagnetic flux concentrator having an end portion thereof affixed to said galvanomagnetic sensing element, said first and second ferromagnetic flux concentrators extending as cantilevers, substantially parallel to one another and maintaining a substantially fixed spacing therebetween;
 said permanent magnet and first flux concentrator juxtaposed with said galvanomagnetic sensing element and second ferromagnetic flux concentrator for magnetic interconnection therebetween, wherein upon relative linear displacement therebetween along a longitudinal axis substantially parallel to a characteristic line of elongation of said first flux concentrator, said galvanomagnetic sensing element is operative to sense magnetic flux passing therebetween and produce an output signal indicative of the relative position therebetween.

* * * * *